United States Patent
Duarte et al.

[11] 3,761,216
[45] Sept. 25, 1973

[54] DOUGH PRESS

[76] Inventors: Ruben G. Duarte; Manuel G. Duarte, both of 1012 E. Nevada St., El Paso, Tex. 79902

[22] Filed: Mar. 25, 1971

[21] Appl. No.: 128,049

[52] U.S. Cl. ............................... 425/214, 425/409
[51] Int. Cl. ......................... A21c 9/00, B30b 1/04
[58] Field of Search .................. 425/406, 409, 407, 425/450, 214

[56] References Cited
UNITED STATES PATENTS

| | | | |
|---|---|---|---|
| 2,180,061 | 11/1939 | La Grange | 425/409 X |
| 1,628,310 | 5/1927 | DeRoos | 425/409 X |
| 2,167,876 | 8/1939 | Coseboom | 425/409 X |
| 2,724,164 | 11/1955 | Smith et al. | 425/214 X |
| 1,202,863 | 10/1916 | McCormick | 425/214 |
| 1,680,463 | 8/1928 | Magaziner | 425/409 |
| 2,317,526 | 4/1943 | Hayes | 266/23 D |
| 1,117,929 | 11/1914 | Turnbull et al. | 425/409 X |
| 2,574,831 | 11/1951 | Jameson et al. | 425/409 X |

Primary Examiner—J. Spencer Overholser
Assistant Examiner—David S. Safran
Attorney—Clarence A. O'Brien and Harvey B. Jacobson

[57] ABSTRACT

A fixed lower plate and a pivotally mounted upper plate selectively movable into parallel closely overlying relation to the lower plate for the pressing of dough therebetween. The lower and upper plates have gas burners mounted immediately outward thereof for a heating of the dough in conjunction with a pressing thereof.

3 Claims, 5 Drawing Figures

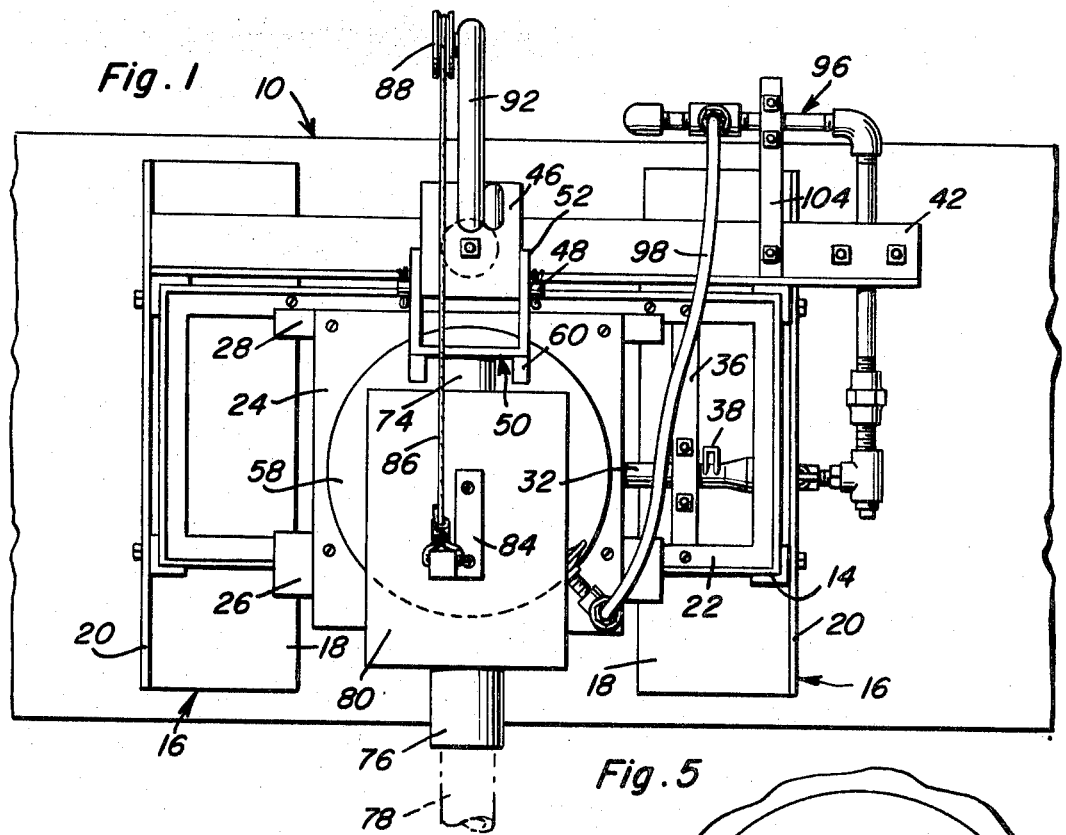
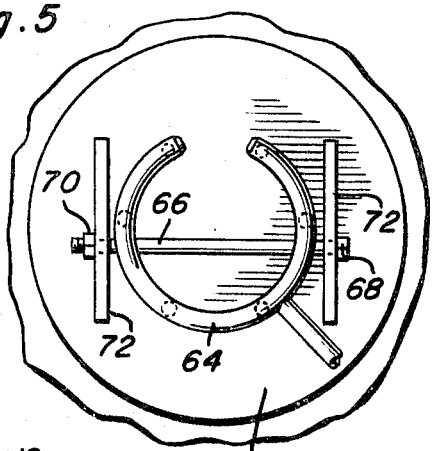
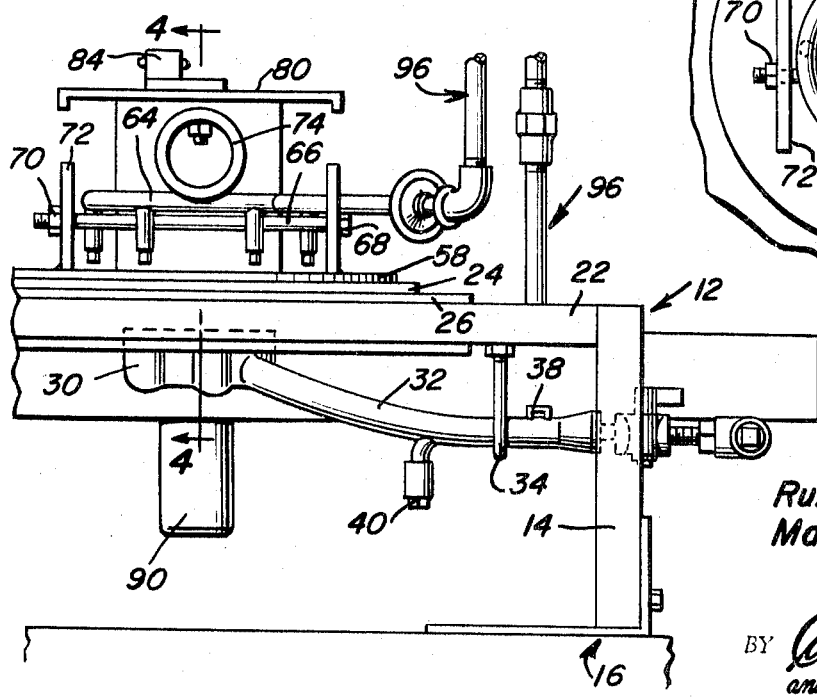

PATENTED SEP 25 1973 3,761,216

Ruben G. Duarte
Manuel G. Duarte
INVENTORS

BY Clarence A. O'Brien
and Harvey B. Jacobson
Attorneys

DOUGH PRESS

The present invention is concerned with a dough press particularly adapted for use in the formation of flour tortillas, pizza shells, pie crusts, Syrian bread and the like. More particularly, the invention herein relates to a dough press which combines uniquely mounted and cooperating pressing plates with gas heating means associated with each plate whereby a combined pressing and heating of the dough is effected, resulting in a rapid expansion of the dough and a proper spreading of the dough into a circular disc.

In the making of dough products of the type herein concerned, the normal procedure heretofore has been to manually flatten and shape the dough with a rolling pin, this being both slow and difficult work, as well as work requiring skilled labor. It is a primary object of the instant invention to provide a device which overcomes the difficulties noted. More particularly, it is contemplated that the machine of the instant invention, operable by unskilled labor, easily, rapidly and efficiently form a dough ball into a circular disc through merely a downward swinging of an upper unit combining a gas burner and a pressing plate against a similarly constructed lower unit.

Other advantages of the instant invention include the provision of a dough press which is of a sturdy relatively simple construction capable of providing continuous trouble-free operation. The machine, because of the nature of the construction thereof, is adapted to be constructed to accommodate pressing plates of any size required for a particular product. Further, the upper plate and burner unit, such being the unit manipulated during the pressing operation, is counter-balanced for facilitating its manipulation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the machine of the instant invention;

FIG. 3 is a partial front elevational view;

FIG. 5 is a view of the top pressing plate and the associated burner.

Figure 2:
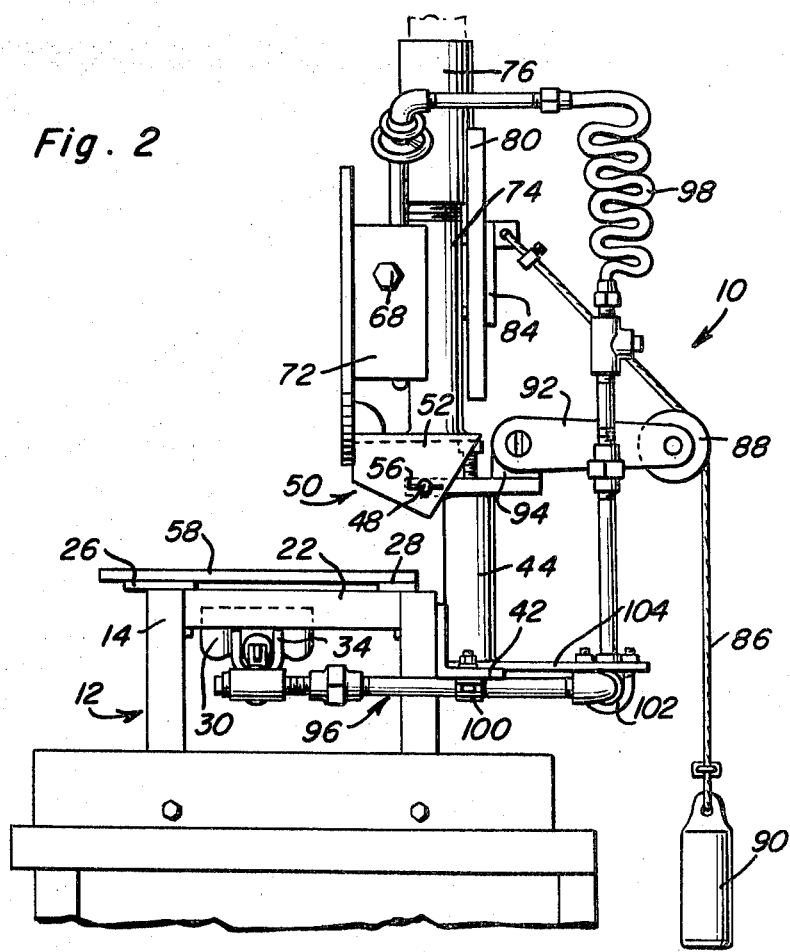
FIG. 2 is a side elevational view of the machine.

Referring now more specifically to the drawings, reference numeral 10 is used to generally designate the apparatus of the instant invention. The apparatus 10 includes a mounting frame 12 comprising four vertically elongated angle legs 14 arranged in a rectangular pattern with the lower ends thereof fixed to a pair of opposed horizontally elongated wide flange angle members 16. The angle members 16 include, in each instance, a horizontal base flange 18 and a vertical flange 20 which lies along the corresponding pair of vertical angle legs 14 as will be readily appreciated from the drawings. The upper ends of the vertical legs 14 are interconnected by a rectangular angle iron frame, frame 22, positioned immediately inward thereof and welded or otherwise directly secured thereto.

A lower flat square pressing plate 24 spans the supporting framework 12 from front to rear centrally between the opposed sides thereof and is supported on the angle iron frame 22 by appropriate front and rear support members 26 and 28 affixed to the frame 22 and projecting upwardly so as to provide a stable base to which the plate 24 is bolted.

An upwardly directed gas burner 30 is positioned immediately below the plate 24 for an effective heating thereof. The burner 30 is mounted on one end of a rigid gas line 32 which is in turn supported by a U-bolt 34 having the opposed upper ends thereof received through a support strap 36 extending from front to rear across the angle iron frame 22 to one side of the lower heating plate 24. The upper ends of the U-bolt 34 are of course nut secured in a manner whereby a vertical adjustment thereof is possible. This adjustment in turn results in an adjustment of the rigid line 32 and an adjustment of the burner 30. An appropriate tilt handle 38 can also be provided on the line for a leveling of the burner 30. Gas is introduced into the line 32, as well as the rest of the system as shall be described presently, from an appropriate supply line which will connect at the point designated by the reference numeral 40.

A support ledge 42, which can constitute the horizontal flange of an angle member, is affixed to the framework and extends horizontally along the rear thereof. A vertically elongated tubular support post 44 is affixed to the support ledge 42 and rises vertically therefrom to a point substantially above the lower pressing plate 24. The post 44 is centrally aligned with and located rearward of the lower plate 24. A flat mounting plate 46 is welded horizontally across the upper end of the post 44, projecting both forwardly and rearwardly therefrom.

The forward portion of the plate 46 includes a pair of oppositely projecting rod ends 48 which rotatably mount a support yoke 50. The support yoke 50 includes a pair of opposed side panels 52, each of which receives one of the rod ends 48 therethrough, and a front panel 54. The side panels 52 are retained on the rod ends by appropriate outer pins or the like 56. It will be noted that the yoke 50 projects a substantial distance both above and below the mounting plate 46, the lower end of the yoke mounting the forwardly projecting upper press or pressing plate 58. This upper plate is to be circular in shape, such being the contemplated configuration of the dough as it is pressed from a dough ball. If so desired, a pair of rigidifying fillers 60 can be provided between the front panel 54 and the forwardly projecting top plate 58 for a strengthening and rigidifying of the interengagement therebetween.

With specific reference to FIG. 4, it will be noted that the height of the yoke 50 below the mounting plate 46 is such so as to position the upper pressing plate 58 in parallel relation to the lower pressing plate 24 immediately thereabove, preferably at a spacing corresponding to the desired thickness of the dough product. In this manner, a uniformly thick product is assured.

With reference to FIG. 2, it will be noted that the yoke 50, and particularly the front panel 54, projects a distance above the mounting plate 46 sufficient so as to enable an engagement of the rear surface of the front panel 54 with the abutment head of a vertically adjustable screw 62 threaded through an internally threaded bore within the mounting plate 46. The bolt 62, in conjunction with the front panel 54 of the yoke 50, will provide a limit to the upward swinging of the top unit of the device, as well as a rest or support therefor in its upwardly swung position.

The top pressing plate 58 also has a gas burner 64 associated therewith, this upper gas burner 64 being in the nature of a gas ring having a series of jets depending therefrom so as to direct the heating flames against the upper surface of the top panel 58. The support of the burner 64 is effected by an elongated bolt 66 passing beneath the burner ring and having the opposite ends thereof, formed respectively by an integral bolt head 68 and a threaded end mounted nut 70, engaged with a pair of opposed upwardly projecting plates 72 welded directly to the upper surface of the upper pressing plate 58. The bolt 66 is so positioned as to fixedly retain the burner 66 against the overlying manipulating arm 74.

Figure 4:
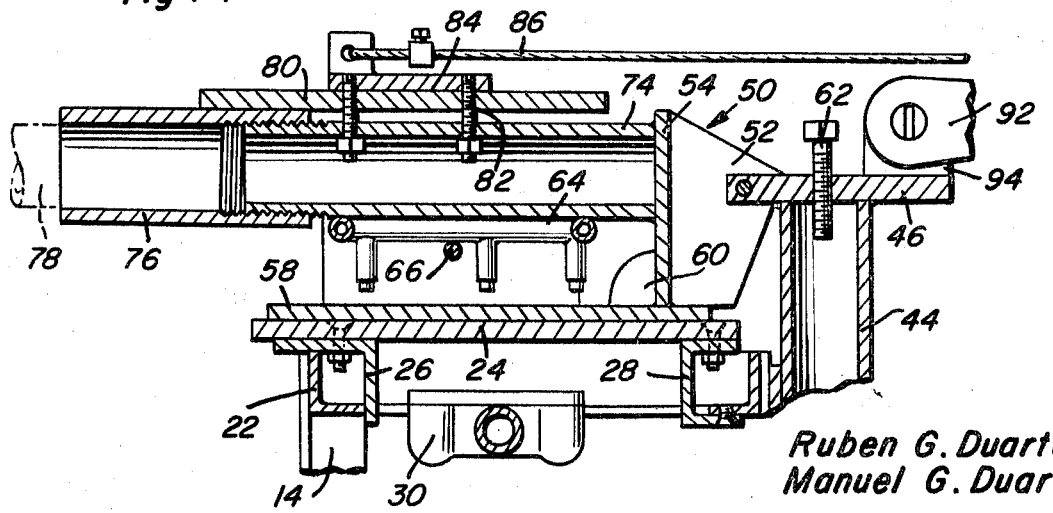
FIG. 4 is an enlarged cross-sectional detail taken substantially on a plane passing along line 4—4 in FIG. 3.

The manipulating arm 74, again noting FIG. 4, is welded to the front yoke panel 54 and project forwardly therefrom immediately above the upper burner 64. The forward end of the arm 74 is externally threaded and mounts a hollow handle socket or sleeve 76 which in turn telescopically receives a removable elongated handle rod 78. The removable handle 78 is desired so as to enable a substantial increase in the effective length of the manipulating arm during the actual use of the apparatus 10 so as to greatly facilitate the actual pressing operation. By the same token, the fact that the handle 78 is removable, allows it to be removed during periods when the apparatus is not in use, thereby avoiding the constant presence of an elongated outwardly projecting handle such as might interfer with other uses of the space about the apparatus 10.

A flat cover plate 80 is welded to the sleeve 76 and projects rearwardly therefrom in overlying relation to the manipulating arm 74 and the underlying gas burner 64 so as to provide a protective shield therefor, the burner 64 being confined between the cover plate 80 and the underlying pressing plate 58. The cover plate 80 can be further stablized by a pair of elongated threaded bolts 82 projecting vertically through the plate 80 and the manipulating arm 74, being nut secured within the interior of the arm 74. These bolts 82 will also mount a plate overlying bracket 84 to which one end of a counter-weight cable 86 is secured. The cable 86 extends rearwardly of the support post 40 and about a rearwardly located vertically orientated pulley 88. The lower end of the cable 86 is affixed to an appropriate counter-weight 90. The pulley 88 is mounted on a rearwardly directed support arm 92 adjustably affixed to a vertical mount 94 welded to and projecting upwardly from the rearwardly extending portion of the mounting plate 46. As will be readily appreciated, the purpose of the counter-weight 90 is to counter-balance the weight of the upper unit, including the upper pressing plate 58, the associated burner 64, and the manipulating structure associated therewith. It is contemplated that the counter-weight 90 be sufficient so as to automatically raise the upper unit upon a release thereof, or at least be sufficient so as to maintain the upper unit in any position in which it is manually placed.

The gas is supplied to the upper burner 64 through a series of piping 96 which connects to the gas pipe 32 and extends laterally and rearwardly thereof to a point behind the support frame 12. Rearward of the support frame 12, the piping 96 extends vertically and incorporates, as the upper portion thereof, a length of flexible gas tubing 98 which selectively expands and contracts as the upper combination pressing plate and heater unit is swung from a vertical to a horizontal position and back again. The flexible tubing 98 is engaged with the upper burner 64 by appropriate rigid pipe units which extend from the upper burner 64 as will be appreciated from the drawings. The piping 96 is supported, noting FIGS. 1 and 2, by a U-strap 100 underlying the piping and bolted to the support ledge 42 as the piping passes therebeneath, and also by a U-bolt 102 cradling the piping adjacent the point at which it projects vertically and affixed to the outer end of an overlying bar 104 bolted to and projecting rearwardly from the support ledge 42.

From the foregoing, it will be appreciated that a highly unique dough press has been defined. The dough press combines both pressing and heating features whereby an effective forming of a dough ball into a circular disc can be easily achieved, the heat facilitating a rapid expansion of the dough into the desired shape. The size of the disc formed, within limit, will be determined by the amount of pressure applied thereon by the downward swinging manually controlled upper pressure plate. This upper pressure plate, is counterbalanced so as to facilitate a proper manipulation thereof and assist in enabling the application of the desired pressure, as well as functioning as a means for retaining the upper pressing unit in a vertically positioned stored orientation. As previously indicated, the apparatus is adapted for use in the formation of many types of dough products, in each instance turning out the product rapidly and efficiently. Incidentally, if deemed advisable under particular circumstances, electric burners can be used in the same manner as the above discussed gas burners.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A dough press comprising a lower fixed horizontally orientated plate, an upper plate selectively movable from a generally vertical position in upwardly spaced relation to said lower plate to a horizontal position closely overlying said lower plate for a pressing of dough therebetween, a lower heater located below and in plate heating association with said lower plate, an upper heater located above and in plate heating association with said upper plate, said upper heater being movable with said upper plate and maintaining said heating association therewith throughout the movement of the upper plate, a frame supporting said lower plate and associated heater, a vertical post mounted on said frame and projecting upwardly therefrom, said post terminating in an upper end in vertically spaced relation above said lower plate, and means mounting said upper plate on the upper end of said post for pivotal movement between the aforementioned positions, said means mounting said upper plate comprising a rigid yoke fixed to the upper side of said upper plate and projecting laterally therefrom, said yoke pivotally engaging the upper end of the post in laterally spaced relation to the upper plate whereby said upper plate, in the horizontal position thereof, will be positioned below the point of pivotal engagement of the yoke with the post, said yoke projecting beyond the upper end of said post, the upper end of said post including a vertically adjustable abutment thereon, the portion of said yoke projecting beyond the upper end of said post engaging said abutment upon a swinging of the upper plate to the generally vertical position thereof, an elongated manipulating arm fixed to said yoke and horizontally overlying said upper plate, said manipulating arm terminating in a socket on the end thereof remote from said yoke, and an elongated handle selectively receivable within said socket for a manipulation of said arm and thereby the yoke and upper plate, said upper plate including a pair of laterally spaced upwardly projecting flanges affixed thereto parallel to the manipulating arm to the opposite sides thereof, and an elongated bolt received through and between said flanges below said manipulating arm, said upper heater being retained between said manipulating arm and said bolt.

2. The press of claim 1 including counter-balance means engaged with the upper plate assembly for a biasing thereof from the horizontal position to the generally vertical position, said counter-balance means comprising an elongated cable having a first end fixed to the upper plate assembly in spaced relation to the yoke, and a second end fixed to a counter-weight positioned to the opposite side of the yoke and post, and guide means receiving and guiding said cable during the longitudinal movement thereof as the upper plate is moved between the vertical and horizontal positions thereof.

3. The press of claim 2 including a flat cover affixed to said manipulating arm in overlying spaced parallel relation to the upper heater, said cover mounting the first end of the cable and defining a protective shield over the upper heater.

* * * * *